United States Patent [19]

Makiel

[11] Patent Number: 4,640,875
[45] Date of Patent: Feb. 3, 1987

[54] FUEL CELL GENERATOR CONTAINING A GAS SEALING MEANS

[75] Inventor: Joseph M. Makiel, Monroeville, Pa.

[73] Assignee: Westinghouse Electric Corp., Pittsburgh, Pa.

[21] Appl. No.: 699,118

[22] Filed: Feb. 7, 1985

[51] Int. Cl.⁴ .................. H01M 8/10; H01M 2/08
[52] U.S. Cl. ................................. 429/30; 429/31; 429/35; 429/39; 429/26
[58] Field of Search .................. 429/30, 31, 35–39, 429/26

[56] References Cited

U.S. PATENT DOCUMENTS

| | | | |
|---|---|---|---|
| 2,666,091 | 1/1954 | Martin et al. | 136/161 |
| 3,485,676 | 12/1969 | Hodgson | 136/86 |
| 3,523,830 | 8/1970 | Baker et al. | 136/86 |
| 3,616,334 | 7/1972 | Aker et al. | 204/129 |
| 4,374,184 | 2/1983 | Somers et al. | 429/31 X |
| 4,395,468 | 7/1983 | Isenberg | 429/31 |
| 4,476,196 | 9/1984 | Poeppel et al. | 429/32 |
| 4,476,198 | 9/1984 | Ackerman et al. | 429/32 |
| 4,514,475 | 4/1985 | Mientek | 429/35 |
| 4,520,082 | 5/1985 | Makiel | 429/26 |

FOREIGN PATENT DOCUMENTS

| | | |
|---|---|---|
| 44753 | 7/1981 | European Pat. Off. |
| 55011 | 8/1981 | European Pat. Off. |
| 2025320 | 7/1979 | United Kingdom |
| 2128013 | 9/1983 | United Kingdom |

Primary Examiner—Brian E. Hearn
Assistant Examiner—Stephen J. Kalafut
Attorney, Agent, or Firm—Daniel P. Cillo

[57] ABSTRACT

A high temperature solid electrolyte electrochemical generator is made, operating with flowing fuel gas and oxidant gas, the generator having a thermal insulation layer, and a sealing means contacting or contained within the insulation, where the sealing means is effective to control the contact of the various gases utilized in the generator.

19 Claims, 5 Drawing Figures

FIG. I

FUEL CELL GENERATOR CONTAINING A GAS SEALING MEANS

GOVERNMENT CONTRACT CLAUSE

The Government of the United States of America has rights in this invention pursuant to Contract No. DE-AC-0280-ET-17089, awarded by the United States Department of Energy.

BACKGROUND OF THE INVENTION

1. Field of the Invention

This invention relates to solid electrolyte electrochemical cells, and more particularly provides a gas confinement scheme for a generator system comprised of such cells.

2. Description of the Prior Art

High temperature solid electrolyte fuel cells convert chemical energy into direct current electrical energy, typically at temperatures of from about 700° C. to 1200° C. This temperature range is required to render the solid electrolyte sufficiently conductive for low power losses due to ohmic heating. With such cells, expensive electrode catalysts and refined fuels are not required. For example, carbon monoxide-hydrogen fuel mixtures can be used directly, without conversion.

High temperature fuel cell generators employing interconnected, tubular fuel cells, with solid electrolytes, are disclosed by A. O. Isenberg, in U.S. Pat. No. 4,395,468, and by E. V. Somers et al., in U.S. Pat. No. 4,374,184. Support tube, fuel electrode, air electrode, solid electrolyte, and interconnection configurations for individual fuel cells, are disclosed by A. O. Isenberg, in U.S. Pat. No. 4,490,444. In the Isenberg fuel cell generator, an exterior metal housing having a contacting, internal thermal insulation layer, usually low density alumina, surrounds a generating chamber containing a fuel inlet, a combustion product or preheating chamber containing a combustion product outlet, and an oxidant inlet chamber. The array of individual fuel cells are contained in the generator chamber.

Yttrium stabilized zirconia is a prime electrolyte candidate for the fuel cells, and is used in a thin layer disposed between an air electrode and a fuel electrode, all supported on porous ceramic tubular support structures. The support tubes for thin film high temperature solid oxide electrolyte cells can be made of calcium stabilized zirconia, and serve as ducts for one of the reactants, fuel or oxidant. Many such fuel cells must be connected electrically in series for high voltages, since each cell has a terminal voltage of approximately 0.6 volt.

Sealing and supporting of such fuel cells has been a concern because fuel and oxidant reactants must be separated to a large extent, to avoid interaction other than electrochemical combustion. Additionally, it has been found that water vapor formed in the generating chamber, and also carried into the preheating chamber, can carry water through the thermal insulation layer and condense it on any surfaces whose temperatures are below the dew point of the gas mixture in either chamber. Such a "heat pipe" type effect can reduce the insulating effectiveness of the insulation surrounding all of the chambers. Additionally, any hydrogen gas component of the inlet fuel, if permitted to permeate the thermal insulation in the generating chamber, will reduce the insulation value by displacing air, since hydrogen has a very high thermal conductivity compared with air.

What is needed is a gas confinement scheme for the generator system; to separate the insulation layer from the fuel mixture, and/or to separate the gases found in the generating and preheating chambers. Such a scheme should not involve sealing arrangements.

SUMMARY OF THE INVENTION

The disclosed generators eliminate complex seals and allow the oxidant gas, fuel gas, fuel product gas, and an optional insulation gas to communicate in a controlled manner. In one concept the oxidant gas, and the fuel gas, which can contain hydrogen, will be separated by a seal passing through the porous, gas permeable thermal insulation, extending inwardly from the exterior housing and positioned at a point between the fuel gas inlet chamber and the combustion product chamber. In another concept the electrochemical generator will have a thermal insulation volume, containing thermal insulating gas, disposed between an exterior and interior housing, where the interior housing is disposed between and can act as a continuous seal between the thermal insulation and all internal gases and defines an interior volume containing electrochemical cells. In a third concept an expansion seal is preferably utilized in the interior housing at a point between the fuel gas inlet chamber and the combustion product chamber. The generator has associated therewith, means to introduce fuel gas and oxidant gas into the interior volume, and in the second and third concepts, insulating gas into the thermal insulation, where the insulating gas is maintained at a pressure higher than the other gases contained within the interior volume.

In preferred form, a gas tight exterior housing having contacting internal thermal insulation surrounds an interior volume having three chambers which communicate among one another through controlled gas seepage. A fuel gas inlet, or generating chamber, is separated from a combustion product or preheating chamber by a gas porous partition. The combustion product chamber is separated from an oxidant gas or an air inlet chamber by a metal sheet.

Tubular solid oxide electrolyte fuel cells are disposed within the interior housings and preferably extend from the combustion product chamber to the generating chamber. The tubular cells are closed-ended within the generating chamber, and open-ended within the combustion product chamber. The cells thus pass through and can be partially supported by the porous barrier.

Oxidant carrying conduits are loosely supported at one end by the tube sheet, and extend through the combustion product chamber and into the open ends of the fuel cells. Each conduit corresponds to a single fuel cell and extends through the cell to a point near its closed end. The conduit includes an open end, or discharge holes, near the closed end of the fuel cell, so as to discharge air into the fuel cell.

In the concepts utilizing an interior housing, a gas permeable, porous, internal thermal insulating layer will contain a thermal insulating gas, such as air, nitrogen, or argon, at a pressure P' allowing flow through the insulation, and the pressure P' will be greater than the fuel gas, fuel product gas, or oxidant gas pressure P. This air, or inert insulating gas will preferably be contained within the pore matrix of a gas permeable insulating material, such as a refractory, for example, alumina fibers. The internal thermal insulation will be disposed between the exterior housing and the interior housing also surrounding all three chambers. In the third concept, utilizing an expansion seal, there will generally be a controlled gas leakage; so that the pressurized, thermal insulating gas will slowly seep into at least the combustion product chamber at a pressure greater than the fuel gas or reacted fuel product gas, helping to prevent contamination of the insulation. In the concepts where the interior housing is used, the flowing thermal insulating gas can sweep away any hydrogen which may have been present in the fuel gas and which may have diffused through the metal interior housing.

In the third concept, utilizing an expansion seal, the interior housing is made up of two adjoining sections which join in the area of the gas porous partition between the fuel gas inlet chamber and the combustion product chamber. The seal joint separating the two housing sections can be an expansion seal joint having a simple trough seal design, which compresses a porous, refractory material. This design allows for interior housing expansion and contraction upon thermal cycling or during operation of the fuel cell generator, and allows leakage flow of insulating gas from the thermal insulation pores into the interior volume of the generating chamber. Such controlled leakage of insulating gas prevents the fuel or reacted fuel product gas from entering and contacting the thermal insulation layer in the thermal insulation volume. The third concept can be used when a single piece interior housing, or the use of a metal seal through the insulation are not feasible or desired.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENT

Figure 1:
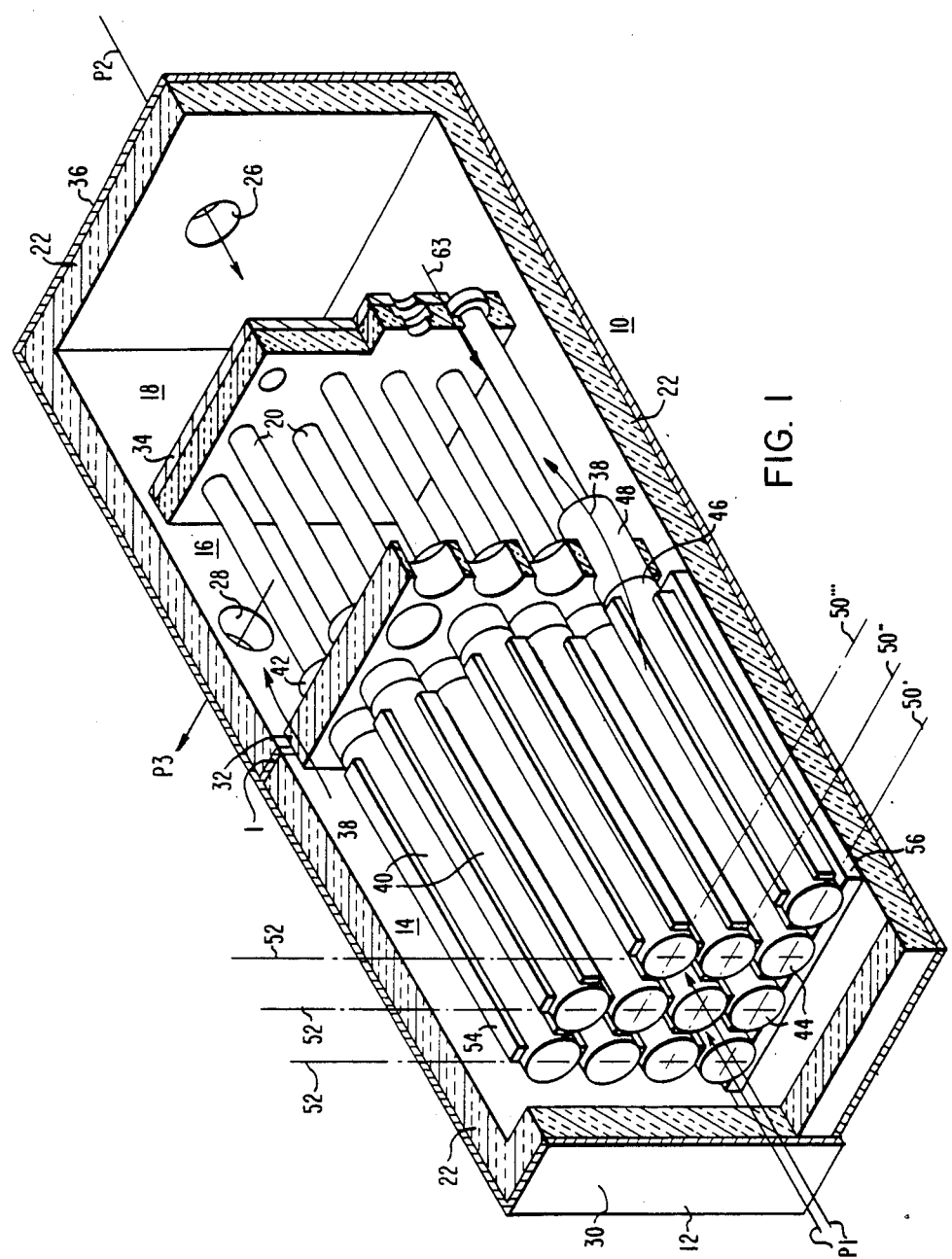
FIG. 1 is a broken perspective view of one embodiment of a fuel cell generator in accordance with one concept of the invention, utilizing a seal through the insulation and not utilizing an interior housing.

As shown in U.S. Pat. No. 4,395,468, herein incorporated by reference, a fuel cell arrangement or stack can comprise a plurality of elongated annular fuel cells. Each fuel cell is preferably tubular and is electrically connected at least in series to an adjacent cell. The electrical connection is made along a selected axial length of the cells, preferably the entire electrochemically active length. Each cell generates an open circuit voltage of approximately 0.6 volt, and multiple cells can be connected in series in order to provide a desired system voltage.

Referring now to FIGS. 1 through 4, there is shown one embodiment of a fuel cell generator 10 including an exterior housing 12. While the generator is shown in a square configuration in FIGS. 1 through 3, the generator and all associated housings can quite advantageously be of a circular or oval cross section. The exterior housing 12 surrounds at least one chamber, a fuel gas inlet or electrical energy generating chamber 14, containing a fuel gas, generally containing hydrogen, at a pressure P1. An oxidant gas inlet chamber 18, containing an oxidant gas at a pressure P2 can be utilized, as shown in FIGS. 1 through 4. A combustion product or preheating chamber 16 can also be contained within the housing 12. Other means for manifolding an oxidant into conduits 20 and then into the generating chamber can also be utilized.

The exterior housing 12 is preferably comprised of 1/32 inch to about 1/16 inch thick steel, and lined throughout with an internal thermal insulation 22, initially containing air as an insulating gas. This thermal insulation is disposed as shown between opposite ends of the generator. In the concept shown in FIG. 1, where no internal housing is used between the porous thermal insulation 22 and the fuel, combustion, and oxidant gases, said gases, including water vapor will permeate the insulation. To prevent fuel gas or reacted fuel gas from inlet chamber 14 from contacting air or other oxidant, or passing to the other chambers 16 and 18, except through gas permeable partition 32, a seal 1, which can be a metal sheet inward extension of exterior metal housing 12, disposed through the thermal insulation 22 can be used at a point between fuel gas inlet chamber 14 and the other chambers 16 and 18, preferably contacting the porous partition 32 and extending to the exterior housing, as shown.

The concept shown in FIG. 1 could be used in large generators where heat loss through the exterior housing is not as important as simplicity of design. However, in many instances such heat losses are important and the thermal insulation must be protected from hydrogen gas permeation so that the insulation will retain its insulating gas within its pores. One method to accomplish this is to provide a continuous interior housing susceptible to only minor hydrogen permeation at generator operating temperatures, to insure the integrity of the thermal insulation.

Figure 2:
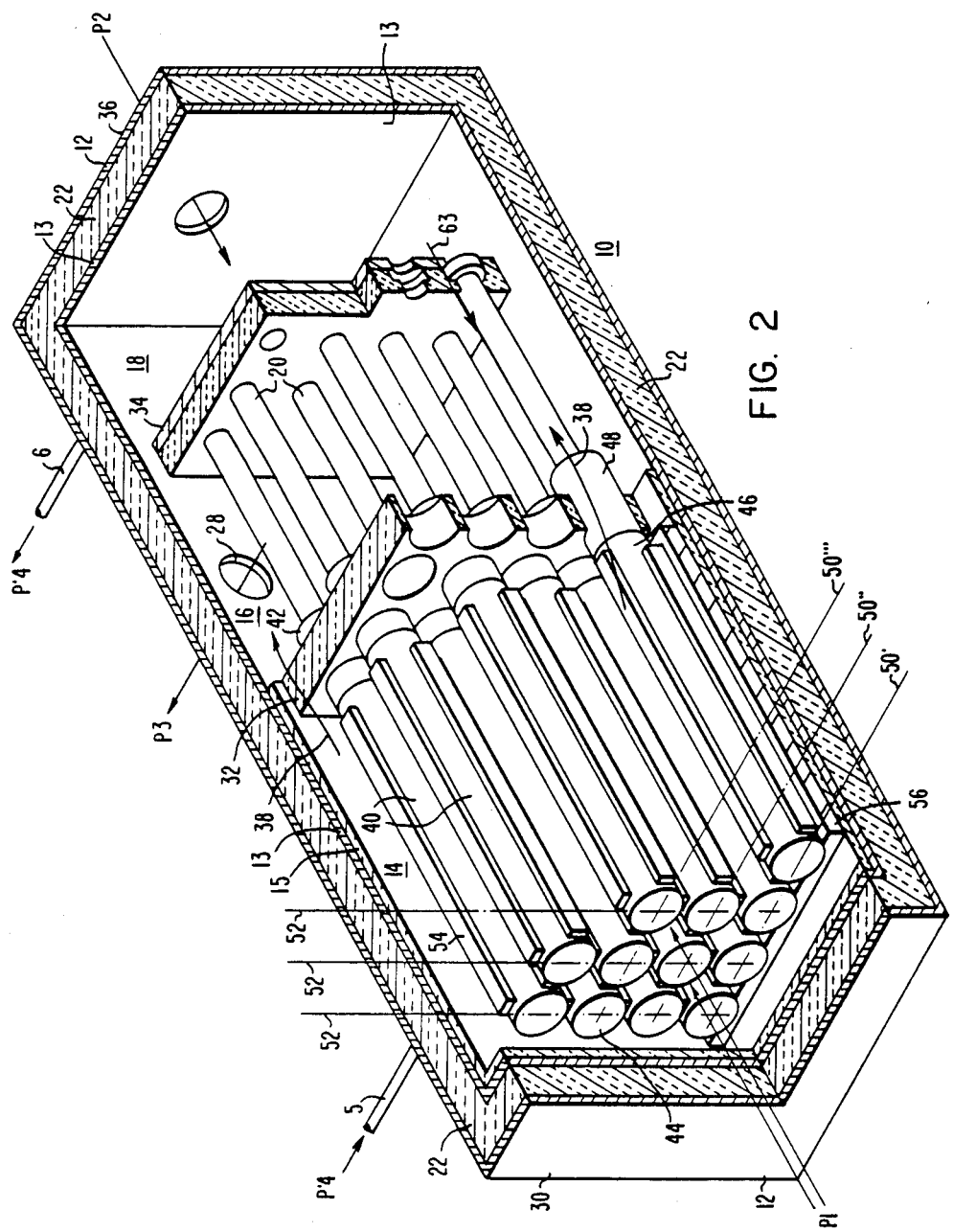
FIG. 2 is a broken perspective view of one embodiment of a fuel cell generator in accordance with a second concept of the invention, utilizing an interior housing acting as a continuous seal.

The continuous internal housing, shown as 13 in FIG. 2, is preferably comprised of materials resistant to hot contacting gases. Electrical insulation, to prevent possible shorting of fuel cells to the interior housing within the generator chamber, is shown as 15 in FIGS. 2 through 4. Penetrating the housings, and insulation, is a fuel inlet means or port 24, shown in FIG. 4, an air inlet means or post 26, and a combustion product outlet means or port 28, as well as ports 57 for electrical leads 58, shown in FIG. 4. Shown in FIG. 2 are insulating gas entry means or port 5 and insulating gas exit means or port 6. In the concept of FIG. 2, preferably utilizing a continuous interior housing acting as a continuous seal, any hydrogen that permeates the interior housing can be transported or flushed out by the stream of insulating gas that enters port 5 and exits port 6. The insulating gas will be fed into entry port 5 at a pressure effective to pass it through the porous thermal insulation, and preferably out the exit port 6. In its progress during generator operation it can sweep out hydrogen along the way, where the insulating gas is an inert gas, and/or consume i.e., combust, hydrogen where the insulating gas is air. Useful insulation gases include air, nitrogen or an inert gas such as argon, or mixtures thereof and are described in further detail later in the specification. Ports 5 and 6 pass through the exterior housing but not the interior housing.

Figure 3:
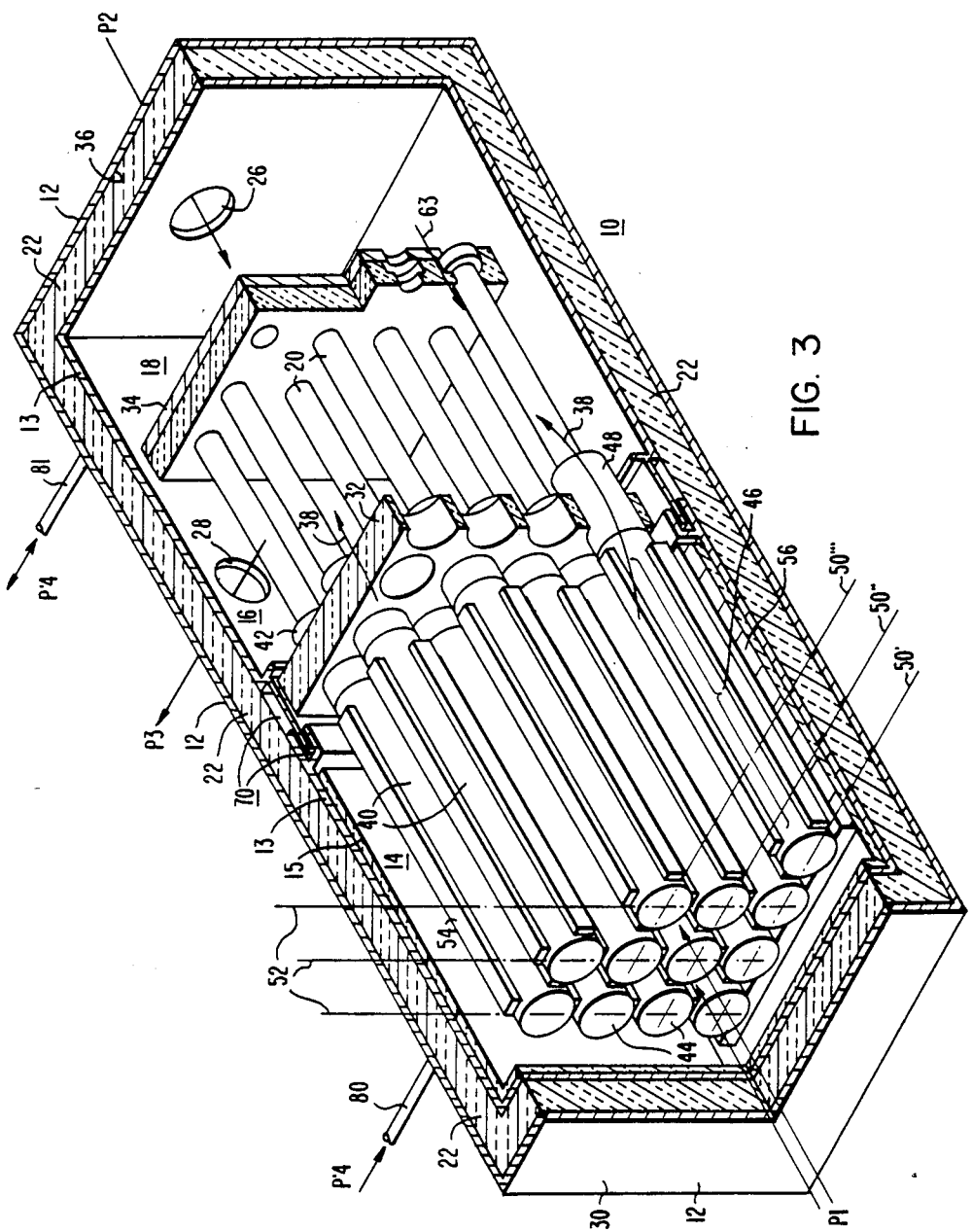
FIG. 3 is a broken perspective view of one embodiment of a fuel cell generator in accordance with a third concept of the invention, utilizing an expansion seal.
Figure 4:
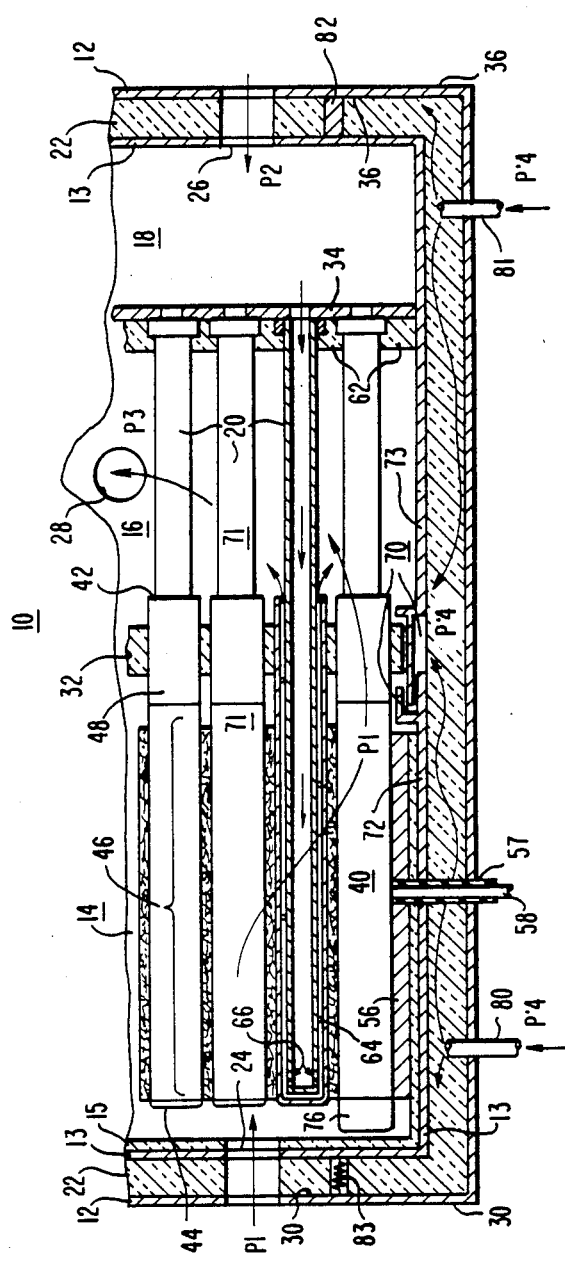
FIG. 4 is a view, partially in section, of a generator such as shown in FIG. 3.

The generating chamber 14, shown in FIGS. 2 through 4, extends between an end wall 30 of the housing 12 and a gas porous partition 32. The preheating chamber 16 extends between the gas porous partition 32 and a support structure such as a metal sheet 34. The oxidant inlet chamber 18 extends between the sheet 34 and another end wall 36 of the housing 12. The dividing barriers can include other structural types, and additional support and flow baffles can be incorporated. The shown barriers, the porous partition 32 and the sheet 34, need not be sealed structures. The porous partition 32, in particular, is designed to allow flow between the generating chamber 14, operating at an approximate pressure slightly above atmospheric, and the preheating chamber 16, operating at a slightly lower pressure than the generating chamber, as indicated by arrow 38. While the generator 10 is shown in a horizontal orientation in FIGS. 1 through 4, it can be operating in a vertical or other position, and, as mentioned previously, can be of a circular or other design.

High temperature electrochemical cells, such as elongated, solid oxide electrolyte annular fuel cells 40 are disposed within the generator interior volume and extend between the preheating chamber 16 and the generating chamber end wall. The cells have open ends 42 in the preheating chamber 16, and closed ends 44 in the generating chamber 14. The fuel cells are preferably tubular, including a solid oxide electrolyte sandwiched between two electrodes, preferably supported on a tubular porous support. Each cell includes an electrochemically active length 46 and an inactive length 48. The active length is contained within the generating chamber 14. The closed end 44 of the cell is electrochemically inactive, and can serve for final preheating of reactant fuel.

Each individual cell generates approximately 0.6 volt, and a plurality are electrically interconnected, preferably in a series-parallel rectangular array. For descriptive purposes, the arrangement can be described as including rows 50 and columns 52. Each cell in a row 50 is electrically connected along its active length 46 to the next adjacent cell, preferably through direct contact of their outer peripheries. For the preferred configuration shown in FIG. 1, where fuel flows about each cell and an oxidant, such as air, flows within each cell, the anode is the outer periphery of each cell and the cathode is on the inside. Thus, cell-to-cell contact within a row is in parallel, among adjacent anodes. Each cell in a column 52 is electrically interconnected in series to the next adjacent cell 40. In the preferred configuration, this interconnection is made from the inner cathode of one cell to the outer anode of the next consecutive cell, through an interconnect 54.

With the configuration described and shown in FIGS. 1 through 4, hundreds of cells can be so connected to achieve the desired voltage and current output. The direct current electrical energy thus generated is collected by a single current collector, preferably a conductive metal plate 56 or felt pad, positioned in electrical contact with each cell 40 in the first row 50', and a similar second collector (not shown), positioned in contact with the last row. Electrical leads 58, shown in FIG. 4, are accordingly provided to the current collectors.

The oxidant conduits 20 are preferably loosely supported at one end in the sheet 34 as shown best in FIG. 4. The sheet 34 is preferably stainless steel, with bores 60 that fit loosely about the conduits 20 to allow free thermal expansion. The conduits 20 are preferably comprised of alumina, and the sheet 34 is covered with an insulation 62 such as low density alumina. A small leakage of oxidant, as indicated by arrow 63, is acceptable.

The conduits 20 extend from the sheet 34 into the open end 42 of the fuel cells 40, a single conduit 20 corresponding to a single fuel cell. Each conduit 20 extends to the active length 46 of the fuel cell, and preferably close to the closed end 44 of the cell, as shown in FIG. 2, the conduit 20 being inserted close to, but spaced from, the closed end 44. Radial supports 64 can be utilized to support each conduit 20 within the corresponding fuel cell 40. Each conduit can be provided with a means for discharging a reactant medium into the fuel cell 40, such as openings 66. The conduits can also be open ended and spaced from the end 44 of the fuel cell, or can extend into direct contact with the end 44 of the cell, so long as thermal expansion is accommodated.

The gas porous partition 32, which allows a throughput of depleted fuel, is preferably a porous ceramic baffle, such as one comprised of fibrous alumina felt, or ceramic plate segments with porous inserts such as ceramic wool plugs, surrounding each fuel cell 40. Small holes 9, shown in FIG. 5, can also be drilled through this partition 32.

Figure 5:
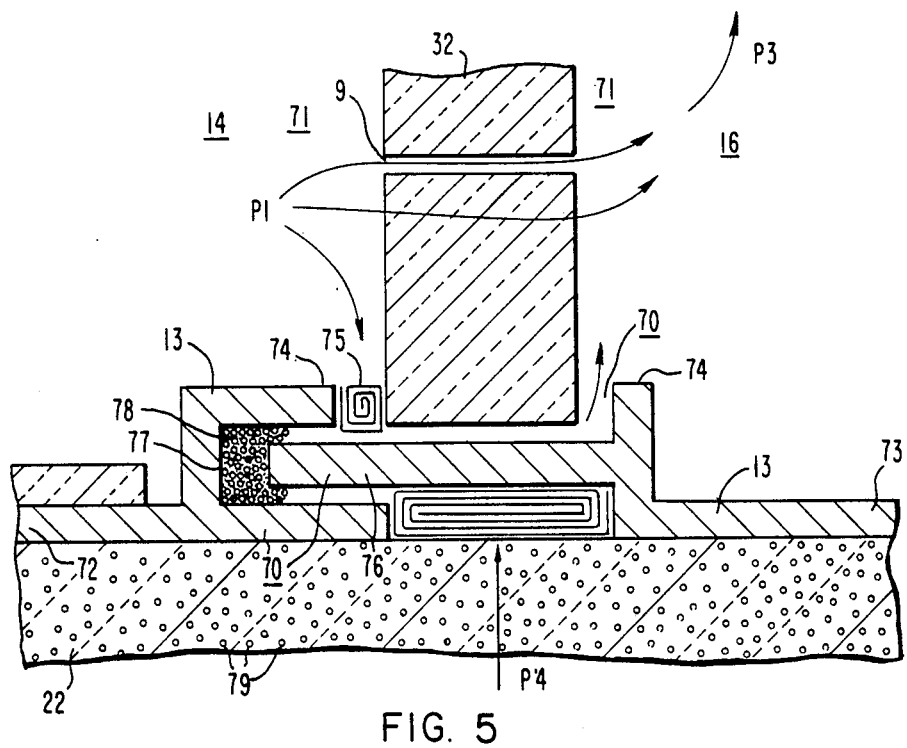
FIG. 5 is a view, in section, of one embodiment of the expansion seal shown in FIG. 3 and FIG. 4.

According to the third concept of this invention, the interior housing can consist of two sections and contain a separate seal 70, best shown in FIG. 5. Preferably, this seal will allow for expansion of the interior housing, yet prevent hydrogen or water vapor entry. However, a separate, complete hydrogen seal would be very complicated. As an alternative, the seal 70 could perform expansion and hydrogen exclusion functions, by allowing thermal insulating gas maintained at a pressure P' higher than any other gas within the generator, to seep or leak at a controlled rate into the interior volume 71 of the generator. The arrows shown in FIG. 5 indicate probable gas flow. The preferred sealing means 70 can be, for example, an expansion joint having the simple trough seal design shown most clearly in FIG. 5, where the interior housing 13 comprises two sections, 72 and 73.

The seal 70 allows for longitudinal and radial expansion and contracting of sections 72 and 73 upon thermal cycling or during operation of the fuel cell generator. Preferably, section 73, will be made of a material resistant to hot oxidant gas, such as nickel based alloys with chromium and iron, for example Inconel 600, containing 76% Ni, 15% Cr and 8% Fe. Preferably, section 72, will be made of a material resistant to hot fuel gas, such as a very high chromium nickel alloy, for example Inconel 601, containing 60.5% Ni, 23% Cr, 14% Fe and 1.35% Al. Both sections will be from about 1/32 inch to about 1/16 inch thick.

The preferred seal 70 could have, for example, inner lands 74 which could compress a flexible winding of alumina fiber sheet 75 into porous partition 32, as sections 72 and 73 move together due to longitudinal and radial thermal expansion. Additionally the bottom lip 76 of section 73 would be forced down into the trough 77 of section 72, which trough could be filled with fine ceramic powder 78, such as alumina powder, or a packaging of flexible winding of alumina fiber sheet. As shown in FIG. 5, minimal insulating or other gas would flow through winding 75. The insulating gas would preferentially pass through to the inner land 74 contained in preheating chamber 16. Any insulating gas passing through winding 75 would be immediately swept through the porous partition 32 or the opening 9. Any hyrodgen permeating the metal interior housing at operating temperature of the generator could be consumed, i.e., combusted, if the insulating gas is air, or if an inert gas is used, hydrogen could be swept through the valve 70 into the interior of the preheating chamber 16 or swept through the insulation and possibly out a top vent, such as at 81, maintaining the insulating efficiency of the thermal insulation 22.

The gas permeable thermal insulation layer 22, will be from about 2 inches to about 8 inches thick, and made of any suitable thermal insulation having a low thermal conductivity. The thermal insulation will contain small interconnected voids or pores within the insulation matrix body capable of containing a gas. The preferred thermal insulation is a refractory material, such as compacted alumina fibers, preferably from about ¼ inch to about 3 inches long. The preferred insulation density is from about 8 lb./cubic foot to about 15 lb./cubic foot, providing a porosity of from about 60% to about 85%. Naturally the more porous the insulation the more insulating gas it can contain. The minute voids or pores are designated as 79 in FIG. 5.

The internal, gas permeable thermal insulation 22 is disposed between the interior housing and the gas tight exterior housing, and will contain a high molecular weight thermal insulating gas having a low thermal conductivity, i.e. a gas that has a molecular weight of at least about 12, preferably a molecular weight between 14 and 85, and that has an insulating effect substantially greater than hydrogen, for example, preferably, air, nitrogen, or an inert gas such as argon, or mixtures thereof. This gas has over 100 times the insulating effect of the refractory matrix, and it is essential to keep its composition intact. Argon is the most preferred insulating gas, since it would reduce the oxidation rate of outside surfaces of the interior housings.

In the third concept of this invention, utilizing an expansion seal, and illustrated in FIGS. 4 and 5, the thermal insulating gas will be maintained at a pressure higher than the other gases contained within the interior volume near the seal, be they fuel gas, fuel product gas, or oxidant gas, so that thermal insulating gas flows into the interior volume of the generator, generally into the combustion preheating chamber 16, through the seal channel gas leakage means. Preferably, the thermal insulating gas will be at a pressure of at least about 0.05 psi. higher than the pressure of any gases near the seal. A preferred pressure differential to insure controlled leakage of thermal insulating gas would be from about 0.05 psi to about 0.2 psi higher than the pressure of any gases near the gas leakage means. Pressure differentials over about 0.2 psi may cause structural deformation of the exterior and interior housings. This third concept allows insulating gas leakage as a means of controlling hydrogen and water vapor contamination of the thermal insulation and could be used if the use of a continuous interior housing presents fabrication or expansion problems justifying a more complicated sealing arrangement. The same pressure range is also applicable to the second concept, where a continuous interior housing is used, i.e., from at least about 0.05 psi to about 0.2 psi higher than the gases in the interior volume of the fuel cell generator.

Usually, fuel enters inlet port 24 at a pressure P1 of about 14.9 psi, and oxidant enters inlet port 26 at about 15.1 psi, but due to pressure losses generally contacts reacted fuel gas at about 14.9 psi. Combustion product gases in combustion pre-heat chamber 16 exit outlet 28 at about 14.7 psi. In the concept utilizing an expansion seal, the insulating gas, given such other gas pressures, will be pumped through insulating gas inlet 80 and optional insulating gas inlet 81, and maintained at a pressure P′4 of about 15.15 psi to about 15.3 psi.

The insulating gas inlet 80, and optional insulating gas inlet or top vent outlet 81, shown in FIGS. 3 and 4, provide means for passing the pressurized thermal insulating gas into the pores of the thermal insulating layer. The ports 80 and 81 pass through the gas tight exterior housing 12, but not through interior housing 13. Inlet 80 will discharge pressurized insulating gas into the pore volume of the insulation layer 22. The pressurized insulating gas, which can be fed into the insulation layer at about 25° C. in all instances where an interior housing is used, passes through the insulation layer via interconnected pores and channels and leaks out into the interior volume of the generator through seal 70, shown in FIGS. 3 through 5, preventing any other gases, including water vapor, near the gas leakage valve from contacting or permeating the thermal insulation layer. Thermal expansion of the interior housing will help reduce excess leakage of the insulating gas into the interior chambers of the generator. When port 81 is used as a vent, inert insulating gas such as Argon can be allowed to bleed off with any hydrogen it may be sweeping out.

In FIG. 4, dense zirconia or alumina standoff means 82, shown which attach interior housing section 73 to the exterior housing 12. These standoffs resist any movement of housing section 73 and help control thermal expansion and contraction. Nickel alloy compression springs 83, which attach interior housing section 72 to the exterior housing 12 are also shown. These springs also help control thermal expansion of interior housing section 72, and prevent lip 76 from contacting the bottom of trough 77. Both of these expansion control means are optional. The electrical insulation 15 prevents shorting contact and need not contain insulating gas. These standoffs, springs and electrical insulation can be used when an interior housing is used.

During operation, an oxidant such as air enters the inlet chamber 18 through inlet port 26. The chamber 18 functions as an inlet manifold for the individual conduits 20. Air enters the conduits at a temperature of approximately 500° C. to 700° C., and a pressure above atmospheric, being initially heated prior to entering the housing by conventional means such as a heat exchanger coupled with a blower, not shown. The air flows within the conduits, through the preheating chamber 16, where it is further heated to a temperature of approximately 900° C. The air then flows through the length of the conduit, being further heated to approximately 1000° C., and is discharged through the openings 66, shown in FIG. 2, into the fuel cell 40. The air within the fuel cell electrochemically reacts at the fuel cell cathode along the active length 46, depleting somewhat in oxygen content as it approaches the open end 42 of the cell. The depleted air is discharged into the combustion product or preheating chamber 16.

A fuel, such as hydrogen or a mixture of carbon monoxide with hydrogen, flows from pumping and preheating apparatus, not shown, into the generating chamber 14 through fuel inlet port 24, shown in FIG. 2. The fuel flows over and about the exterior of the fuel cells, electrochemically reacting at the anode. The fuel inlet port 24 is preferably located near the closed end 44 of the cells 40. The fuel accordingly depletes as it approaches the porous barrier 32. The depleted fuel, containing approximately five percent to fifteen percent of its initial fuel content, diffuses through the barrier 32 and into the combustion preheating chamber 16.

The combustion product gas, including oxygen depleted air and depleted fuel, along with any air leaking into the preheating chamber 16 through the sheet 34, directly react exothermically. The heat of this reaction, which completely combusts the fuel, along with the sensible heat of the depleted fuel and air, is utilized to preheat the incoming air. The combustion products are discharged through combustion product outlet port 28 at a temperature of approximateley 700° C. The remaining energy in the combustion products can be utilized to preheat the incoming air or fuel through, for example, an external heat exchanger or to generate steam in conventional generating apparatus, not shown.

It may also be desirable to preheat the fuel further prior to its contacting the active length 46 of the fuel cells 40. To acomplish this, the fuel cells 40 can include an enlarged inactive section 76 at the fuel entry end of the housing. The pressure in the preheating chamber 16 is lower than that of the generating chamber 14 or oxidant inlet chamber 18 in order to assure controlled directional leakage.

A generator in accordance with the arrangement described in self-starting, since fuel is essentially combusted to provide hot, oxidant-rich gases for the cathode. Additionally, preheated fuel provides the gas for the anode. Also, lean fuel is directly combusted with oxidant in the combustion product chamber to further preheat the oxidant until a load is applied to the cells, at for example, an active cell temperature of 700° C., Ohmic heating ($I^2R$) in addition to the heat of the electrochemical reaction, including polarization and entropic heat, will bring the generator up to its median operating temperature of approximately 1000° C. at the active area.

Electrical contacts to series-parallel connected cells is made preferably on the fuel side via metal plates, metal rods and felt metal pads. The contacts can be cooled in the feed through point of the external housing below the level where metal oxidation is detrimental.

I claim:

1. A high temperature solid electrolyte electrochemical generator comprising:
    (A) an exterior housing;
    (B) a gas permeable thermal insulation layer disposed next to and within the exterior housing;
    (C) an interior volume defined by the thermal insulation, said volume containing a fuel gas inlet generating chamber and a combustion product chamber containing combustion product outlet means, with a gas permeable partition dividing said fuel gas inlet generating chamber and combustion product chamber;
    (D) a plurality of electrochemical cells, having solid electrolyte, disposed within the generating chamber;
    (E) means for supplying fuel gas and oxidant gas to the electrochemical cells for reaction in the generating chamber, so that reacted fuel gas passes through the gas permeable partition; and
    (F) seal means disposed through the thermal insulation and extending from the exterior housing to the gas permeable partition, so that reacted fuel gas cannot pass from the generating chamber into the combustion product chamber through the thermal insulation, but must pass through the gas permeable partition into the combustion product chamber.

2. The electrochemical generator of claim 1, where the seal is a metal sheet seal and the electrochemical cells are tubular fuel cells, where each fuel cell includes an electrochemically active length and an inactive length, said active length being contained within the generating chamber and said inactive length passing through the gas permeable partition.

3. A high temperature solid electrolyte electrochemical generator comprising:
    (A) an exterior housing;
    (B) an interior housing contained within the exterior housing;
    (C) a plurality of electrochemical cells, having solid electrolyte, disposed within the interior housing;
    (D) a gas permeable thermal insulation containing a thermal insulating gas disposed between the exterior housing and the interior housing; and
    (E) means for passing said insulating gas through the thermal insulation.

4. The electrochemical generator of claim 3 also containing means for flowing oxidant gas and hydrogen containing fuel gas to contact the electrochemical cells and the interior housing, where the interior housing is disposed between the thermal insulation and the oxidant gas and the hydrogen containing fuel gas, where said hydrogen in the fuel gas can permeate the interior housing at the operating temperature of the generator, and where the thermal insulating gas passing through the thermal insulation is effective to consume and/or sweep away hydrogen gas which permeates the interior housing and enters the thermal insulation.

5. The electrochemical generator of claim 3, where the interior housing consists of two sections which are separated by means of a seal.

6. The electrochemical generator of claim 3, where the electrochemical cells are fuel cells, the insulating gas is selected from the group consisting of air, nitrogen, inert gas, and mixtures thereof, and the generator also contains means for collecting current generated by the plurality of electrochemical cells.

7. A high temperature solid electrolyte fuel cell generator comprising:
    (A) an exterior housing;
    (B) an interior housing contained within the exterior housing;
    (C) a gas permeable thermal insulation layer containing a thermal insulating gas having a molecular weight over about 12 disposed between the exterior housing and the interior housing;
    (D) means for passing said insulating gas into and out of the thermal insulation;
    (E) an interior volume having a plurality of chambers, including a generating chamber, defined by the interior housing;
    (F) a plurality of elongated fuel cells, having solid electrolyte, each having an electrochemically active length, disposed within the generating chamber; and (G) means for flowing (1) hydrogen containing fuel gas, capable of reacting at the fuel cells to form fuel product gas, and (2) oxidant gas into the generating chamber to contact the fuel cells; where the interior housing is disposed between the thermal insulation and the oxidant gas and the hydrogen containing fuel gas, where said hydrogen in the fuel gas can permeate the interior housing at the operating temperature of the generator, and where the thermal insulating gas passing through the thermal insulation is effective to consume and/or sweep away hydrogen which permeates the interior housing and enters the thermal insulation.

8. The fuel cell generator of claim 7, where the interior housing consists of two sections which are separated by means of a seal.

9. The fuel cell generator of claim 7, where the thermal insulating gas is selected from the group consisting of air, nitrogen, inert gas, and mixtures thereof.

10. The fuel cell generator of claim 7, where the thermal insulation layer is a refractory material containing interconnected pores within the insulation matrix, and the thermal insulating gas is selected from the group consisting of air, nitrogen, argon, and mixtures thereof.

11. The fuel cell generator of claim 7, where the thermal insulation layer comprises alumina fibers, and the generator also contains means for collecting electrical current generated by the plurality of fuel cells.

12. A high temperature solid electrolyte electrochemical generator comprising:

(A) an exterior housing;

(B) an interior housing contained within the exterior housing, said interior housing containing gas permeable seal means and defining a fuel gas inlet generating chamber and a combustion product chamber containing combustion product outlet means, with a gas permeable partition dividing said fuel gas inlet generating chamber and combustion product chamber;

(C) a plurality of electrochemical cells, having solid electrolyte, disposed within the generating chamber;

(D) a gas permeable thermal insulation containing a thermal insulating gas disposed between the exterior housing and the interior housing;

(E) means for flowing oxidant gas and fuel gas to contact the electrochemical cells; and (F) means for maintaining said insulating gas at a pressure higher than the other gases contained within the interior housing near the gas permeable seal means, so that insulating gas flows into the interior of the generator through the gas permeable seal means.

13. The electrochemical generator of claim 12, where the electrochemical cells are elongated fuel cells containing solid oxide electrolyte, gases contained within the interior housing are prevented from entering the thermal insulation volume by the flow of thermal insulating gas, the thermal insulating gas has a molecular weight of over about 12, the gas permeable seal means is also an expansible seal, and the gas permeable seal means separates the interior housing into two sections at the gas permeable partition, so that the seal means is disposed next to the gas permeable partition.

14. The electrochemical generator of claim 12, where the thermal insulating gas is selected from the group consisting of air, nitrogen, inert gas, and mixtures thereof, and where the pressure of the thermal insulating gas is at least about 0.05 psi higher than the pressure of the other gases near the gas permeable seal means.

15. The electrochemical generator of claim 12, where the generator also contains means for passing thermal insulating gas under pressure into the thermal insulation layer, and where the pressure of the thermal insulating gas is from about 0.05 psi to about 0.2 psi higher than the pressure of the other gases near the gas permeable seal means.

16. The electrochemical generator of claim 12, where the thermal insulation layer is a refractory material containing interconnected pores within the insulation matrix, and the thermal insulating gas is selected from the group consisting of air, nitrogen, argon, and mixtures thereof.

17. The electrochemical generator of claim 12, where the thermal insulation layer comprises alumina fibers, and the generator also contains means for collecting electrical current generated by the plurality of electrochemical cells, and means to pass insulating gas out of the thermal insulation and out of the generator.

18. The electrochemical generator of claim 12, where the fuel gas contains hydrogen, said hydrogen can permeate the interior housing at the operating temperature of the generator, and where the pressurized thermal insulating gas is effective to consume and/or sweep away hydrogen gas which permeates the interior housing and enters the thermal insulation.

19. The electrochemical generator of claim 12, where the fuel gas and oxidant gas enter at opposite ends of the generator and where at one end the interior housing is attached to the exterior housing by means of dense standoffs, and at the other end the interior housing is attached to the exterior housing by means of compression springs, where the standoffs and springs are effective to help control thermal expansion of the interior housing at the seal means during generator operation.

* * * * *